3,641,055
SULFONIUM YLIDS OF ACTIVE METHYLENE
COMPOUNDS
John G. Moffatt, Los Altos, Calif., assignor to Syntex
Corporation, Panama, Panama
No Drawing. Continuation-in-part of application Ser. No.
621,761, Mar. 9, 1967. This application Feb. 10, 1969,
Ser. No. 798,190
Int. Cl. C07d 63/14, 63/16
U.S. Cl. 260—332.3 R       10 Claims

ABSTRACT OF THE DISCLOSURE

Sulfonium ylids, prepared from sulfoxides and compounds possessing an active methylene group, are anti-fungal agents. Their prepaartion is carried out in the presence of an N,N′-disubstituted carbodiimide and an acid.

---

This is a continuation-in-part of my co-pending U.S. application No. 621,761, filed on Mar. 9, 1967, and now abandoned.

This invention relates to sulfonium ylids and to processes for their preparation from sulfoxides and active methylene compounds.

This invention is directed not only to a new process for the preparation of sulfonium ylids, but it is also directed toward a wide variety of novel sulfonium ylids.

The novel compounds of the present invention can be represented by the formulas:

(I)

and

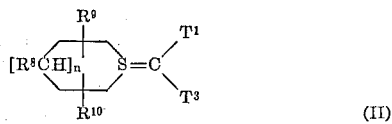

(II)

wherein
$R^1$ is alkyl, cycloalkyl, aralkyl, and aryl;
$R^2$ is alkyl, cycloalkyl and aralkyl;
each of $T^1$ and $T^3$, independently of each other, is the group:

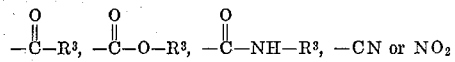

$T^2$ is the group $-\overset{O}{\underset{\parallel}{C}}-R^4$, $-\overset{O}{\underset{\parallel}{C}}-O-R^4$, $-\overset{O}{\underset{\parallel}{C}}-NH-R^4$, or $-NO_2$ $T^1$ and $T^2$ or $T^1$ and $T^3$ taken together with the carbon atom to which they are attached are the group:

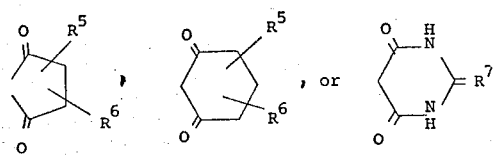

$R^3$ and $R^4$ is alkyl, cycloalkyl, aralkyl, or aryl; each of $R^5$ and $R^6$ is hydrogen, (lower)alkyl, and and $R^5$ and $R^6$ taken together when on adjacent carbon atoms are the group:

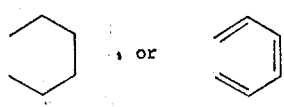

$R^7$ is O or S;
$R^8$ is hydrogen, a carboxylic group, or a carboalkoxy group;

each of $R^9$ and $R^{10}$ is hydrogen, hydroxy, fluoro, chloro, bromo, (lower)alkyl, (lower)alkoxy, or phenyl; $n$ is a positive integer of a value equal to 0 or 1.

The compounds of the present invention are illustrated in the above formulas with the sulfur atom being bonded to the "active" methylene group by a double bond. However, the carbon and sulfur atom may be bonded by other types of bonds; certain bond states being favored under certain environmental conditions, for example, in an aqueous solution the ionic bond state is favored. At the present time, the nature of the bond has not been fully elucidated. Two of the more common states of the bond may be illustrated as follows:

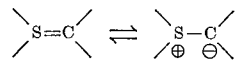

where there is an equilibrium between the two forms.

The sulfonium ylids of the present invention are surprisingly stable compounds in the presence of a wide variety of reagents, such as p-chlorobenzaldehyde, benzyl bromide, methyl iodide, hydrogen bromide, sodium hydroxide, potassium t-butoxide, and the like, which normally react with active methylene groups. When an active methylene compound that is, a compound with one or more active methylene groups, is to be treated with such a reagent, the sulfonium ylid of such compound can be prepared to protect the active methylene group or groups. After the sulfonium ylid intermediate has been treated with the reagent, it is desulfurized by conventional techniques, such as by treatment with Raney nickel, to yield the "treated" active methylene compound. Thus, the preparation of sulfonium ylid intermediates is a means of protecting active methylene groups from attack while the active methylene compound is being treated with reagents that also attack active methylene groups.

The term "alkyl" and derivations thereof, such as alkoxy, alkanoyloxy, and the like, denotes a group comprising a straight or branched chain aliphatic hydrocarbon group. In the context of the present invention, this hydrocarbon group may be of any length, but factors such as availability and cost generally will place a practical upper limit of about 20 carbon atoms. When qualified by the term "lower," such a group will contain no more than 6 carbon atoms.

The term "cycloalkyl" denotes a cyclic hydrocarbon group of from 3 to 12 carbon atoms. Typical cycloalkyls include cyclopropyl, cyclobutyl, cyclohexyl, cyclopentyl and the like.

The term "aryl" denotes a monocyclic aromatic hydrocarbon of six or more carbon atoms. Representative aryls are phenyl, p-tolyl, o-tolyl, 2,6-dimethyl phenyl, p-isopropyl phenyl and m-ethyl phenyl. The term "aralkyl" denotes a hydrocarbon of seven or more carbon atoms, comprising an aliphatic hydrocarbon group substituted with an aryl group. Representative aralkyls are benzyl, p-methylbenzyl, 2-phenethyl, 3-(o - tolyl)propyl, 2,2-diphenyl ethyl and 3,5-diethylbenzyl.

The above aliphatic, cyclic and aromatic hydrocarbon groups can be substituted by functional groups such as lower alkyl, alkenyl, alkynyl, fluoro, chloro, bromo, carboxy, lower haloalkyl, lower alkoxy, lower haloalkoxy, lower cycloalkoxy, carboalkoxy, lower alkanoyl, lower alkanoyloxy, lower haloalkanoyloxy, phenoxy, and the like. Typical substituents include methyl, ethyl, difluoromethyl, trifluoromethyl, 2-fluoroethyl, ethynyl, prop-1′-ynyl, isopropyl, vinyl, 3-chloropropyl, t-butyl, pentyl, cyclopentyl, cyclohexyl, trichloromethyl, difluoromethoxy, carboethoxy, acetyl, acetoxy, caproyloxy, trichloroacetoxy, and the like.

The novel compounds of the present invention are prepared by treating an active methylene compound with at least a molar equivalent, preferably more than a molar equivalent, of an organic sulfoxide and an N,N'-disubstituted carbodiimide in the presence of a Lowry-Brønsted acid. The process is conducted at temperatures ranging from about 0° C. to about 200° C. or more, conveniently at the temperature the reaction attains. Generally the process reaction is exothermic, depending upon the reactants, reagents and solvents used. Thus, the process reaction generally requires no external heating to initiate it. In the event a reaction does not progress satisfactorily, external heat can be applied. For vigorous reactions that are strongly exothermic, external cooling may be necessary. After the initial exothermic reaction has subsided, the mixture is allowed to stand for a period of from about 1 hour to about 48 hours or more at temperatures ranging from about 0° C. to about 200° C. conveniently at room temperature.

The process is carried out under nonaqueous conditions, and all reactants, reagents and solvents therefore must be dry. The process can be carried out under an inert gas, such as dry nitrogen or argon, if desired.

The order in which the reactants, reagents, and solvents are mixed is not critical, except that the carbodiimide and the Lowry-Brønsted acid should be combined in the reaction media.

Almost any active methylene compound or organic sulfoxide can be used in the process, the only limitation being that the compound should not have constituents, such as free hydroxy groups, free carboxylic groups, and free amino groups, that will interact with some of the solvents, reagents, or reactants, during the process. The above mentioned groups are protected, such as by esterification or acylation, prior to the process and then regenerated by hydrolysis after the process, if desired. Other appropriate methods of protection such as ether formation are also employed.

The product of the reaction can be isolated by any of the conventional techniques. For example, the N,N'-di(substituted)urea formed from the carbodiimide during the process is removed by filtration and the product can be isolated from the filtrate by extractions, chromatography, and the like, and further purified by crystallization or chromatography if desired.

Active methylene compounds in the context of the present invention are compounds with a methylene group whose hydrogen atoms are more acidic than the normal hydrogen atoms of a methylene group situated between two alkyl groups. The increased acidity of the hydrogen atoms of an active methylene group results from the positions of vicinal electro-positive or electron withdrawing groups such as phosphono, sulfonyl, cyano, nitro, carbonyl and the like, and the resonance and/or inductive effects associated therein. Typical compounds with active methylene groups include malononitrile, ethylacetoacetate, diethylmalonate, acetylacetone, cyanoacetone, n-octane-3,5-dione, acetoacetanilide, 1,3-decalindione, 1,3-indanedione; dimedone, barbituric acid, 2-thiobarbituric acid, dihydroresorcinol, methyl cyanoacetate, α-cyanoacetophenone; ethyl acetopyruvate, and the like.

Organic sulfoxides in the context of the present invention are disubstituted sulfoxides or cyclic sulfoxides in which the sulfur-carbon bonds are single bonds. The disubstituted sulfoxides are sulfoxides substituted with one or two alkyl or aralkyl groups or with one aryl group and one alkyl alkyl or aralkyl group. The substituted constituents present on the disubstituted sulfoxides can be different. For example, one substituted constituent can be an alkyl group of 1 carbon and the other substituted constituent can be an alkyl group of more than one carbon atom. Normally the substituted constituents which are alkyl or aralkyl groups will be similar. That is, the disubstituted sulfoxide will be a dialkyl sulfoxide or a diaralkyl sulfoxide. Oftentimes the substituted constituents will be identical.

The cyclic sulfoxides are 5 or 6 membered cyclic compounds made up of the sulfoxide group and methylene groups. The cyclic sulfoxides are optionally substituted with fluoro, chloro, methyl, ethyl, phenyl, methoxy, ethoxy, acetoxy groups, and the like.

Many of the organic sulfoxides employed in the process are known and are readily available. Those sulfoxides which are not known per se can be prepared via any of the conventional methods such as oxidation of sulfides with hydrogen peroxide or a peroxy acid, hydrolysis of chlorosulfonium chlorides, the reaction of Grignard reagents with thionyl chloride and the like.

Typical disubstituted sulfoxides which are employed as starting materials in the present process include benzyl decyl sulfoxide, benzyl phenyl sulfoxide, butyl methyl sulfoxide; p-methoxy phenyl methyl sulfoxide; ethyl isoamyl sulfoxide, p-chlorophenyl trifluoromethyl sulfoxide, dodecyl ethyl sulfoxide; ethyl methyl sulfoxide; ethyl p-tolyl sulfoxide; ethyl isopropyl sulfoxide; hexadecyl methyl sulfoxide; dimethylsulfoxide; dipropyl sulfoxide; diethylsulfoxide; dibenzyl sulfoxide; dibutyl sulfoxide, diisopropyl sulfoxide, diamyl sulfoxide; diisoamyl sulfoxide, dihexyl sulfoxide; and the like.

Typical cyclic sulfoxides which are employed as starting materials in the present process include tetramethylene sulfoxide; 2-phenyl tetramethylene sulfoxide; 2,5-dimethyl tetramethylene sulfoxide; 2-methyl-5-methoxytetramethylene sulfoxide; 2-methanoyl tetramethylene sulfoxide; 2,3,4,5-tetrachloro tetramethylene sulfoxide; pentamethylene sulfoxide, 2,6-diphenyl pentamethylene sulfoxide, 4-carboethoxy pentamethylene, and the like.

The acid, that is, the Lowry Brønsted acid, is employed as a proton donor in the process and is preferably a strong acid, such as phosphorous acid, orthophosphoric acid, pyrophosphoric acid, hydrophosphoric acid, hydrophosphorous acid, m-phosphoric acid, trifluoroacetic acid, dichloroacetic acid, iodoacetic acid, dibromoacetic acid, and the like, or an amino salt of a strong mineral acid, halogen acid, or organic acid, such as the pyridinium salts of hydrochloric, sulfuric, perchloric, hypophosphorous, hypophosphoric, trifluoroacetic acid, and the like. The oxyacids of phosphorus, especially ortho phosphoric acid, are preferred. The amount of acid employed will be dependent upon the number of hydrogen aquivalents per equivalent of acid. Generally, about 0.10 to 1 equivalent of hydrogen per molar equivalent of active methylene compound are used, but larger excesses are practical.

If desired, the process can be conducted in an anhydrous, inert, organic solvent. Suitable solvents include aliphatic and aromatic hydrocarbons such as benzene, xylene, hexane, octane, cyclohexane; ethers such as diethyl ether, tetrahydrofuran, dioxane; and halogenated hydrocarbons such as s-dichloroethane, methylene chloride, carbon tetrachloride, chlorobenzene; and the like. It is also practical to use mixtures of miscible solvents. Any amount of solvent can be used, but generally is limited to the amount that puts the active methylene compound into solution. A large excess of solvent may cause dilution of the reactants and reagents and thereby lengthen the reaction time.

The carbodiimide, that is, the N,N'-di(substituted) carbodiimide, employed in the process is preferably an N, N'-di(substituted alkyl) (including aralkyl and cycloalkyl)carbodiimide, such as N,N'-dimethyl carbodiimide, N,N'-dimethylcarbodiimide, N,N' - methylpropylcarbodiimide, N,N'-diisopropylcarbodiimide, N,N'-dicyclohexylcarbodiimide, N,N'-dibenzylcarbodiimide, N,N'-diphenethylcarbodiimide, and the like; N,N'-dicyclohexylcarbodiimide is the one generally employed. However, N,N'-diarylcarbodiimide, such as N,N'-di-p-tolylcarbodiimide and N-alkyl-N'-arylcarbodiimides, such as N-methyl-N'-phenylcarbodiimide can also be employed if desired. The amount of carbodiimide used can range from about 1 molar equivalent to 10 molar equivalents or more, preferably 2.0+.5 molar equivalents, per molar equivalent of the active methylene compound. The amount of organic sulfoxide employed can range from 1 molar equivalent to about 99 molar equivalents or more per equivalent of the active methylene compound.

The amount of excess of the carbodiimide and hydrocarbon sulfoxide employed is not critical. Generally, economics is the principal consideration in determining the amounts of excess that will be utilized.

The sulfonium ylids of the present invention exhibit antifungal properties. Generally the sulfonium ylids are administered topically in the usual pharmaceutically accepted forms, such as in aqueous solutions, ointments and the like. Generally, the sulfonium ylids are administered in concentrations of from about 0.1% to about 5.0%. In addition to the anti-fungal activity of the present compounds, the present compounds, excluding the compounds prepared from barbituric acid, or thiobarbituric acid, are central nervous system stimulants for mammals. For example, methyl 2-(dimethylsulfuranylidene) cyanoacetate [2-dimethylsulfoxide methyl cyanoacetate ylid] produces a moderate stimulation of the central nervous system in mice. The class of sulfonium ylids having 1 to 3 long chain alkyl groups of from 8 to 12 carbon atoms also exhibit detergent and surfactant properties and are useful emulsifying agents.

The class of sulfonium ylids prepared from barbituric acid or from thiobarbituric acid exhibit a depressant action on the central nervous system and can be utilized as sedatives or as soporifics. The ylids are administered either orally or parenterally in pharmaceutically acceptable forms such as pills, capsules, powders, aqueous and nonaqueous solutions and the like. The compounds are usually administered in dosages of from about 0.5 mg. to about 2.0 mg. per kilogram of the patient's body weight. The dosage may be lower or higher, however, depending upon the patient's age, physical condition, and the like. The dosage given will ultimately be dependent upon that chosen by the physician or veterinarian administering it.

These hydrocarbon sulfonium ylids due to their ease of preparation, their stability, their pharmacological, and chemical properties, and their ease of desulfurization serve as valuable products and as intermediates for the preparation of other products.

The following examples will serve to further typify and illustrate the nature of this invention.

EXAMPLE I

Dimedone (1.4 g., 10 mmoles) is dissolved in a mixture of anhydrous dimethyl sulfoxide (140 mmoles, 10 ml.) and benzene (10 ml.). Anhydrous orthophosphoric acid (0.5 g., 5 mmoles) is added followed by dicyclohexylcarbodiimide (5.15 g., 25 mmoles). An exothermic reaction ensued and after cooling the mixture is allowed to stand overnight. Ethyl acetate (50 ml.) is added and dicyclohexylurea (4 g.) removed by filtration. The ethyl acetate solution is extracted with water and the combined aqueous extracts are neutralized to pH 8 with lithium hydroxide, and evaporated to dryness under high vacuum at 50° leaving a yellowish solid residue. This is extracted four times with acetone and the extracts are evaporated leaving a crystalline solid which is recrystallized from acetone to yield 2-dimethyl sulfonium-1,3-dioxo-5,5-dimethylcyclohexylid.

Similarly 2-dipropylsulfoniumcyclohexane - 1,3 - dione ylid can be prepared from dipropyl sulfoxide and 1,3-cyclohexanedione; 2 - diethyl sulfoniumcyclopent-4-ene-1,3-dione ylid can be prepared from diethyl sulfoxide and cyclopent-4-ene-1,3-dione; 2 - (hexyl phenyl sulfonium)-decalin-1,3-dione ylid can be prepared from hexyl phenyl sulfoxide and 1,3-decalindione; and 2-tetramethylene sulfonium tetraline-1,3-dione ylid can be prepared from tetramethylene sulfoxide and 1,3-tetralinedione.

EXAMPLE II

Malononitrile (9.9 g., 150 mmoles) is reacted overnight with dicyclohexylcarbodiimide (50 g., 250 mmoles) and anhydrous phosphoric acid (50 mmoles) in 100 ml. of anhydrous dimethylsulfoxide (140 mmoles). After addition of ethyl acetate, filtration of dicyclohexylurea and repeated extractions with water, the water extracts are neutralized with lithium hydroxide and evaporated to dryness. The residue is extracted with acetone, evaporated and recrystallized from acetone giving dimethylsulfonium dicyanomethylid.

In like manner, by allowing malononitrile to react with diethylsulfoxide, dipropylsulfoxide, dihexylsulfoxide, dicyclohexylsulfoxide, butyldecylsulfoxide, dibenzylsulfoxide, dodecyl ethylsulfoxide, phenyl benzylsulfoxide, tetramethylene sulfoxide, and pentamethylene sulfoxide respectively; diethyl sulfonium dicyanomethylid, dipropylsulfonium dicyanomethylid, dihexylsulfonium dicyanomethylid, dicyclohexylsulfonium dicyanomethylid, butyldecylsulfonium dicyanomethylid, dibenzylsulfonium dicyanomethylid; dodecylethylsulfonium dicyanomethylid, dicyanomethylid, benzylphenylsulfonium dicyanomethylid, tetramethylenesulfonium dicyanomethylid, and pentamethylenesulfonium dicyanomethylid are obtained.

EXAMPLE III

Indane-1,3-dione (1.46 g., 10 mmoles), dicyclohexylcarbodiimide (5.15 g., 25 mmoles), phosphoric acid (5 mmoles), dimethylsulfoxide (10 ml., 140 mmoles) and benzene (10 ml.) were permitted to react overnight at room temperature. The mixture is then extracted with water, neutralized and evaporated. Extraction of the residue with acetone, is followed by crystallization from acetone to yield the desired 2-dimethylsulfonium indane-1,3-dione ylid.

Similarly 2-tetramethylene sulfonium indane-1,3-dione ylid and 2-pentamethylene sulfonium indane-1,3-dione ylid are prepared by respectively using tetramethylene sulfoxide and pentamethylene sulfoxide in place of dimethyl sulfoxide.

EXAMPLE IV

Acetoacetanilide (1.77 g., 10 mmoles), dicyclohexylcarbodiimide (5.15 g., 25 mmoles) and anhydrous phosphoric acid (5 mmoles) and dimethylsulfoxide (10 ml.) and benzene (10 ml.) were allowed to stand for 20 hours at room temperature. Ethyl acetate (100 ml.) is added, and the insoluble dicyclohexylurea is filtered off. The mixture is extracted with four portions of water, and extracts were neutralized, reduced to dryness to yield 2-dimethylsulfonium acetoacetanilide ylid, which is recrystallized from cold acetone. Most of the product remains in the ethyl acetate layer, and it is directly crystallized from ethyl acetate and recrystallized from ethyl acetate ether.

EXAMPLE V

Indane-1,3-dione (1.46 g., 10 mmoles) is allowed to react overnight at room temperature with dicyclohexylcarbodiimide (4 g., 20 mmoles), anhydrous phosphoric acid (5 mmoles), dipropyl sulfoxide (7.3 g., 60 mmoles) and benzene (10 ml.). After addition of ethyl acetate and removal of dicyclohexylurea by filtration the solution is extracted with water and the combined extracts were chromatographed on a silica acid column with ethyl acetate-acetone (1:1). An unidentified red compound is removed, followed by the desired yellow product which is crystallized from ether to yield 2-dipropylsulfonium indane-1,3-dione ylid.

Similarly, 2-diethylsulfonium decalin-1,3-dione ylid is prepared from diethylsulfoxide and 2-diethylsulfonium-1,3-dioxotetraline ylid is prepared from diethylsulfoxide and 1,3-dioxotetraline.

EXAMPLE VI

A mixture of cyclopent-4-ene-1,3-dione (96.0 g., 1 mole), dimethylsulfoxide (234.0 g., 3 moles), dibutylcarbodiimide (308.0 g., 2 moles), anhydrous orthophosphoric acid (49.0 g., 0.5 mole) and 500 ml. of toluene is permitted to react overnight. Ethyl acetate (500 ml.) is added; the resulting mixture is filtered, extracted with five 100 ml. portions of water, neutralized and reduced to dryness under reduced pressure. The residue is taken up in ethyl acetate:acetone and chromatographed on a silicic acid column to yield 2-dimethylsulfonium cyclopent-4-ene-1,3-dione ylid.

EXAMPLE VII

The reaction of acetylacetone (2.0 g., 20 mmoles) with dipropyl sulfoxide (4.0 g., 30 mmoles) dicyclohexylcarbodiimide (8.2 g., 40 mmoles) and anhydrous phosphoric acid (5 mmoles) is carried out overnight in a mixture of benzene (5 ml.) and dimethylformamide (5 ml.). After removal of dicyclohexylurea the product is partitioned between benzene and water. The water layer is evaporated to dryness and chromatographed on silica with ethyl acetate: acetone (1:1) to remove excess dipropyl sulfoxide, dicyclohexylcarbodiimide, etc. The product is crystallized from ether-petroleum to yield crystalline 3-dipropylsulfonium pentane-2,4-dione ylid.

In a similar fashion, di(N,N-diethyl) 2-dimethylsulfonium malonamide ylid is prepared from dimethyl sulfoxide and di(N,N-diethyl)malonamide.

EXAMPLE VIII

The reaction of malononitrile (0.66 g., 10 mmoles), diethylsulfoxide (5.0 g., 50 mmoles), dicyclohexylcarbodiimide (5.15 g., 25 mmoles), and anhydrous phosphoric acid (5 mmoles) is carried out overnight in 5 ml. of benzene. The dicyclohexylurea is removed by filtration and the filtrate is partitioned between water and ethyl acetate. The organic phase is chromatographed on silicic acid and crystallized from acetone:ether to yield diethylsulfonium dicyanomethylid.

In a like manner, methyl 2-dipropylsulfonium cyanoacetate ylid is prepared from 20 mmoles of methyl cyanoacetate, 30 mmoles of dipropylsulfoxide, 20 mmoles of dicyclohexylcarbodiimide, and 10 mmoles of anhydrous phosphoric acid.

EXAMPLE IX

Indane 1,3-dione (1.46 g., 10 mmoles) is reacted with diethyl sulfoxide (10 ml.), dicyclohexylcarbodiimide (5.3 g.) and phosphoric acid (5 mmoles) in benzene (10 ml.). After removal of dicyclohexylurea the product is partitioned between water and ethyl acetate. Chromatography of the organic phase on a silicic acid column with ethyl acetate-acetone (1:2) and crystallization from acetone-ether gives 2-diethylsulfonium indane-1,3-dione ylid., M.P. 139–140° C. Chromatography of the evaporated aqueous layer yields more of the same product to give a total yield 93%.

In the manner of the above process, 2-dicyclohexyl sulfonium 3-oxo-propiononitrile is prepared from dicyclohexyl sulfoxide and 3-oxopropiononitrile.

EXAMPLE X

Reaction of barbituric acid (3.2 g., 25 mmoles) with dicyclohexyl carbodiimide (15 g., 75 mmoles) and anhydrous phosphoric acid (12 mmoles) is carried out in 20 ml. of dimethyl sulfoxide. After removal of dicyclohexylurea the product is partitioned between water and ethyl acetate. The neutralized aqueous phase is evaporated to dryness and crystallized from water yielding 5-dimethylsulfonium barbituric acid ylid.

Similarly, by using 2-thiobarbituric acid in place of barbituric acid, 5 - dimethylsulfonium - 2 - thiobarbituric acid ylid is obtained.

By employing barbituric acid or 2-thiobarbituric acid and diethylsulfoxide, dipropylsulfoxide, ethyl isopropylsulfoxide, ethyl isoamylsulfoxide, or ethyl phenylsulfoxide appropriately in the above process, the following compounds are obtained:

5-diethylsulfonium barbituric acid ylid
5-diethylsulfonium-2-thiobarbituric acid ylid
5-dipropylsulfonium barbituric acid ylid
5-dipropylsulfonium-2-thiobarbituric acid ylid
5-(ethyl isopropylsulfonium) barbituric acid ylid
5-(ethyl isopropylsulfonium)-2-thiobarbituric acid ylid
5-(ethyl isoamylsulfonium) barbituric acid ylid
5-(ethyl isoamylsulfonium)-2-thiobarbituric acid ylid
5-(ethyl phenylsulfonium) barbituric acid ylid
5-(ethyl phenylsulfonium)-2-thiobarbituric acid ylid

EXAMPLE XI

Diethyl malonate (1.6 g., 10 mmoles), dicyclohexylcarbodiimide (5.15 g., 25 mmoles), anhydrous phosphoric acid (5 mmoles), dimethylsulfoxide (10 ml., 140 mmoles), and benzene (10 ml.) are combined. After the reaction has subsided, ethyl acetate is added and the dicyclohexylurea is filtered off. The filtrate is extracted with five portions of water; the aqueous extracts are combined, brought to a pH 8, and evaporated to dryness. The residue is recrystallized from acetone to yield diethyl 2-dimethylsulfoxide malonate ylid.

Similarly, diethyl 2-tetramethylenesulfonium malonate ylid is prepared from tetramethylonesulfoxide and diethylmalonate.

EXAMPLE XII

2-Dimethylsulfonium-3-oxobutyronitrile ylid (14.3 g., 100 mmoles) is added to a solution of aqueous 30% hydrogen peroxide (16.2 g., 100 mmoles), sodium hydroxide (8 g., 200 mmoles), and 50 ml. of water. The resulting mixture is stirred for 4 hours at room temperature. The mixture is neutralized with the addition of aqueous 2 N hydrochloric acid. Then the mixture is reduced to dryness under reduced pressure at room temperature. The residue is recrystallized from acetone to yield 2-dimethylsulfonium-3-oxobutanamide ylid.

EXAMPLE XIII

Diethyl 2-dimethylsulfonium malonate ylid (22.6 g., mmoles) is added to 150 ml. of an aqueous 5% solution of sodium hydroxide. The mixture is allowed to stand at 25° for 2 hours, cooled, and acidified with 2 N aqueous hydrochloric acid. The mixture is evaporated to dryness under reduced pressure at room temperature; the residue is chromatographed on an ion-exchange column and crystallized from acetone to yield 2-dimethylsulfonium malonic acid ylid.

EXAMPLE XIV

Raney nickel (10.0 g.) is added to a solution of 2-dimethylsulfonium-5,5-dimethylcyclohexane - 1,3 - dione ylid (20 g., 100 mmoles) in methanol (100 ml.) and refluxed for 4 hours. The mixture is filtered and evaporated to dryness under reduced pressure. The residue is taken up by acetone and chromatographed on alumina to yield predominately 5,5-dimethylcyclohexan-1,3-dione.

EXAMPLE XV

Ten grams of methyl 2-dimethylsulfonium acetoacetate ylid is added to 100 ml. of aqueous 5% sodium hydroxide; the resulting mixture is allowed to stand for 3 hours. The mixture is then neutralized with aqueous 1 N hydrochloric acid, washed with water and evaporated to yield 2-dimethylsulfonium acetoacetic acid ylid. The free acid is added to 100 ml. of carbontetrachloride containing a molar equivalent of triphenylphosphine. The mixture is stirred for 6 hours at room temperature; then 40 ml. of phenylamine is added to the mixture, which contains 2-dimethylsulfonium acetoacetyl chloride, and the resulting reaction mixture is stirred for 2 hours at room temperature. The mixture is next chromatographed on silicic acid eluting with diethyl ether to yield a fraction containing 2-dimethylsulfonium acetoacetanilide ylid. After the fraction is evaporated, the product is desulfurized by the process of Example XIV to yield acetoacetanilide.

What is claimed is:

1. A compound selected from the group of compounds represented by the formula:

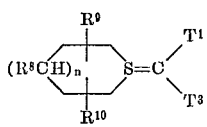

wherein $T^1$ and $T^3$ taken together with the carbon atom to which they are attached are the group

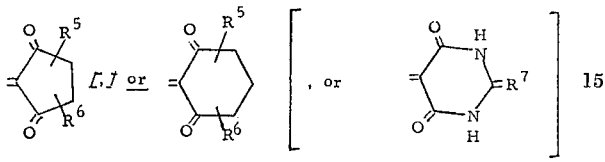

each of $R^5$ and $R^6$ is hydrogen or (lower)alkyl, and $R^5$ and $R^6$ taken together when on adjacent carbon atoms are the group

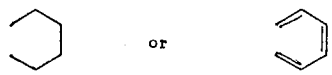

$R^8$ is hydrogen or carboalkoxy having up to 6 carbon atoms; $n$ is a positive integer of a value equal to 0 or 1; and each of $R^9$ and $R^{10}$ is hydrogen, hydroxy, fluoro, chloro, bromo, (lower)alkyl, (lower)alkoxy, or phenyl.

2. A compound of claim 1 wherein $T^1$ and $T^3$ taken together with the carbon to which they are attached are the group

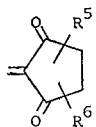

3. A compound of claim 2 wherein $T^1$ and $T^3$ taken together with the carbon to which they are attached are the indane-1,3-dion-2-ylidene group.

4. A compound of claim 3 wherein $R^9$ and $R^{10}$ are hydrogen.

5. A compound of claim 4 wherein $n$ is equal to 0.

6. A process for preparing sulfonium ylids which comprise treating an active methylene compound with at least a molar equivalent of an organic sulfoxide and an N,N'-di(substituted) carbodiimide in the presence of a Lowry-Brønsted acid in an anhydrous inert organic solvent at a temperature of from 0 to 200° C. until a sulfonium ylid is formed, the active methylene compound being selected from the group of compounds represented by the formula:

wherein, $T^1$ and $T^2$ taken together with the carbon atom to which they are attached are the group:

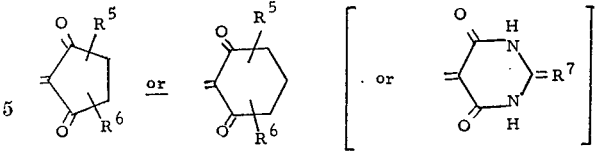

each of $R^5$ and $R^6$ is hydrogen, or (lower)alkyl, and $R^5$ and $R^6$ taken together when on adjacent carbon atoms are the group:

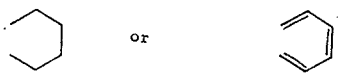

the organic sulfoxide being selected from the group of sulfoxides represented by the formulas:

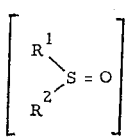 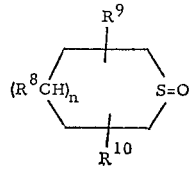

wherein
$R^8$ is hydrogen or a carboalkoxy group having up to 6 carbon atoms;
$n$ is a positive integer of a value equal to 0 to 1; and
each of $R^9$ and $R^{10}$ is hydrogen, hydroxy, fluoro, chloro, bromo, (lower)alkyl, (lower)alkoxy or phenyl; and the substituents of the N,N'-di(substituted) carbodiimide are selected from the group consisting of alkyl having up to 20 carbon atoms, monocyclic aralkyl having up to 11 carbon atoms and 2,2-diphenyl ethyl and cycloalkyl having 3 to 12 carbon atoms.

7. A process according to claim 6 wherein the N,N'-di(substituted)carbodiimide is N,N'-dicyclohexylcarbodiimide.

8. A process according to claim 7 wherein the Lowry-Brønsted acid is an oxy acid of phosphorous.

9. A process according to claim 8 wherein the Lowry-Brønsted acid is ortho phosphoric acid.

10. A process according to claim 6 wherein about 1.0 to about 10 molar equivalents of N,N'-dicyclohexylcarbodiimide and about 1.0 to about 10 molar equivalents of an organic sulfoxide are utilized in the presence of orthophosphoric acid.

References Cited

UNITED STATES PATENTS 3,256,340   6/1966   Russell _____ 260—327

ALEX MAZEL, Primary Examiner

A. M. TIGHE, Assistant Examiner

U.S. Cl. X.R.

260—257, 260, 327 TH, 327 R, 465 D, 465 K, 465.4, 465.9, 470, 481 R, 558 S, 561 S, 590, 562 S, 593 R, 607 B, 999

UNITED STATES PATENT OFFICE
CERTIFICATE OF CORRECTION

Patent No. 3,641,055      Dated February 8, 1972

Inventor(s) John G. Moffatt

It is certified that error appears in the above-identified patent and that said Letters Patent are hereby corrected as shown below:

Column 9, lines 12-18, "[,] or" should read -- or -- and

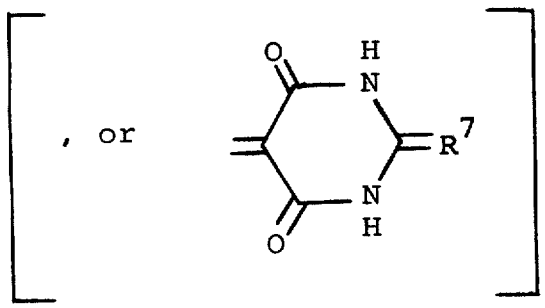   should be omitted.

Column 10, lines 1-7, "or" should read -- or -- and

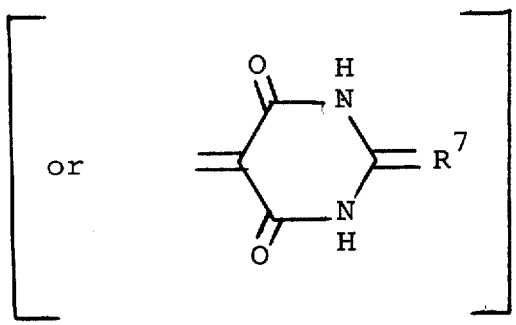   should be omitted.

UNITED STATES PATENT OFFICE
CERTIFICATE OF CORRECTION

Patent No. 3,641,055    Dated February 8, 1972

Inventor(s) John G. Moffatt    Page 2

It is certified that error appears in the above-identified patent and that said Letters Patent are hereby corrected as shown below:

Column 10, lines 16-23

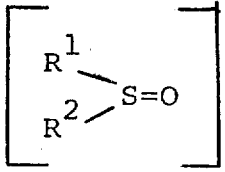    should be omitted.

Signed and sealed this 18th day of July 1972.

(SEAL)
Attest:

EDWARD M. FLETCHER, JR.    ROBERT GOTTSCHALK
Attesting Officer    Commissioner of Patents